(12) United States Patent
Matsui et al.

(10) Patent No.: US 8,801,986 B2
(45) Date of Patent: Aug. 12, 2014

(54) METHOD OF MANUFACTURING MOLDED OBJECT AND MOLDED OBJECT

(75) Inventors: Takeshi Matsui, Tokyo (JP); Nobuhiro Kihara, Kanagawa (JP); Junichi Kuzusako, Saitama (JP)

(73) Assignee: Sony Corporation, Tokyo (JP)

( * ) Notice: Subject to any disclaimer, the term of this patent is extended or adjusted under 35 U.S.C. 154(b) by 172 days.

(21) Appl. No.: 13/568,882

(22) Filed: Aug. 7, 2012

(65) Prior Publication Data

US 2013/0040110 A1 Feb. 14, 2013

(30) Foreign Application Priority Data

Aug. 12, 2011 (JP) .................................. 2011-176608

(51) Int. Cl.
*B29C 67/00* (2006.01)
*G09B 23/30* (2006.01)

(52) U.S. Cl.
CPC ............. *B29C 67/0081* (2013.01); *G09B 23/30* (2013.01)
USPC .......... 264/112; 264/113; 264/308; 428/34.1; 428/402; 434/267; 434/270; 434/274

(58) Field of Classification Search
None
See application file for complete search history.

(56) References Cited

U.S. PATENT DOCUMENTS

| 7,815,826 | B2 * | 10/2010 | Serdy et al. .................... 264/49 |
| 2006/0192315 | A1 * | 8/2006 | Farr et al. ...................... 264/113 |
| 2011/0118527 | A1 * | 5/2011 | Giesel et al. ..................... 600/1 |
| 2011/0190446 | A1 * | 8/2011 | Matsui et al. ................... 525/56 |
| 2012/0018926 | A1 * | 1/2012 | Mannella et al. ............. 264/500 |

FOREIGN PATENT DOCUMENTS

JP   63-236627   10/1988
JP   2010-194942   9/2010

* cited by examiner

*Primary Examiner* — Mary F Theisen
(74) *Attorney, Agent, or Firm* — K&L Gates LLP

(57) ABSTRACT

Disclosed is a method of manufacturing a molded object. The method includes: supplying a first liquid material to a first region out of a molding enabling region where a powder material is arranged and curing the powder material of the first region using a lamination molding technology to form a first insoluble part insoluble in a solvent; supplying a second liquid material different from the first liquid material to the powder material of a second region, which is provided so as to be surrounded by the first region, out of the molding enabling region and curing the powder material of the second region using the lamination molding technology to form a second soluble part soluble in the solvent; and dissolving the second part in the solvent.

8 Claims, 16 Drawing Sheets

CT values

CT values

| Tissue | Values | Remarks |
|---|---|---|
| Water | 0 | |
| Air | −1000 | |
| Fat | −100 | |
| Muscle | 45 | |
| Crystalline lens | 60 | |
| White matter (brain) | 25 | |
| Gray matter (brain) | 35 | |
| Coagulated blood | 90 | Higher than thyroid |
| Bone (calcification) | >400 | 1000 for hard bone |
| Thyroid | 70 | |
| Liver | 50 | |
| Kidney | 35 | Kidney = gray matter |
| Blood vessel | 40 | |
| Metal | >2000 | |

FIG.12

METHOD OF MANUFACTURING MOLDED OBJECT AND MOLDED OBJECT

CROSS REFERENCES TO RELATED APPLICATIONS

The present application claims priority to Japanese Priority Patent Application JP 2011-176608 filed in the Japan Patent Office on Aug. 12, 2011, the entire content of which is hereby incorporated by reference.

BACKGROUND

The present disclosure relates to a method of manufacturing a molded object using a lamination molding technology and the molded object.

Japanese Patent Laid-open No. 63-236627 discloses a technology for manufacturing a human body model using a lamination molding technology. More specifically, according to the manufacturing method, shape data obtained by measuring a human body with a CT (Computed Tomography) scanner is graphic-processed by a computer, so that multilayer tomographic information is obtained. Based on the information, a light beam is irradiated onto a photosensitive resin, and the resin is cured at every unit thickness to form the human body model (see, for example, Japanese Patent Laid-open No. 63-236627).

Further, as an example using the lamination molding technology, a three-dimensional molding apparatus described in Japanese Patent Laid-open No. 2010-194942 selectively supplies ink onto a powder material using ink jet heads based on CT image data to cure the powder material and form a molded object (see, for example, Japanese Patent Laid-open No. 2010-194942).

SUMMARY

It is desired to achieve a molded object capable of accurately reproducing not only its outer shape but also its inner structure.

The present disclosure has been made in view of the above circumstances, and it is therefore desirable to provide a method of manufacturing a molded object capable of accurately reproducing its inner structure and to provide the molded object.

To this end, a method of manufacturing a molded object according to an embodiment of the present disclosure includes supplying a first liquid material to a first region out of a molding enabling region where a powder material is arranged and curing the powder material of the first region to form a first insoluble part insoluble in a solvent.

When a second liquid material different from the first liquid material is supplied to the powder material of a second region, which is provided so as to be surrounded by the first region, out of the molding enabling region and the powder material of the second region is cured using a lamination molding technology, a second soluble part soluble in the solvent is formed.

The second part is dissolved in the solvent.

According to the embodiment of the present disclosure, the second soluble part provided so as to be surrounded by the first insoluble part is dissolved in the solvent to form the molded object having a cavity part provided so as to be surrounded by the first part. As a result, it is possible to form the cavity part inside the molded object and accurately reproduce the inner structure of the molded object.

In the finished molded object, the entire cavity part is not necessarily surrounded by the first part. For example, part of the cavity part may be exposed from the first part. Alternatively, if the entire cavity part is surrounded by the first part in the finished molded object, it is only necessary to form a hole in at least part of the first part to dissolve the second part in the solvent and remove the dissolved second part.

The method of manufacturing the molded object may further include, before dissolving the second part in the solvent, forming a molding die for forming a third part different from the first and second parts of the molded object based on three-dimensional image data of the object to be molded.

When a material different from the powder material is supplied between the molding die and a cured object including the formed first and second parts and the supplied material is cured, the third part covering at least part of the first part is formed.

Because a material for forming the third part is supplied to the molding die before the second part is dissolved in the solvent, it is possible to cause the second part to serve as a mask or a spacer used when the third part is formed.

The third part may be made of a transmission material that causes visible light to be transmitted. If the third part is part where a layer including the front surface of the molded object is formed, it is possible for users to externally see the inside of the molded object via the third part.

The first part may have a base part corresponding to a part not included in the object to be molded and a main body part corresponding to a part included in the object to be molded, the main body part being formed on the base part. In this case, when the third-part is formed, the material for forming the third part is supplied in a state where the molding die is brought into contact with the base part so as to cover the main body part with the molding die. As a result, it is possible to easily form the third part.

The molded object may be formed such that the third part becomes softer than the first part. As a result, it is possible to achieve the molded object having its front surface softer than its inner structure.

The first liquid material may include a binder, and the second liquid material may not include the binder.

In the lamination molding technology, an ink jet head may eject the first and second liquid materials. As a result, it is possible to form the molded object with high precision.

The molded object according to the embodiment of the present disclosure is manufactured using the method of manufacturing the molded object described above.

As described above, according to an embodiment of the present disclosure, it is possible to accurately reproduce the inner structure of a molded object.

These and other objects, features and advantages of the present disclosure will become more apparent in light of the following detailed description of best mode embodiments thereof, as illustrated in the accompanying drawings.

Additional features and advantages are described herein, and will be apparent from the following Detailed Description and the figures.

BRIEF DESCRIPTION OF THE FIGURES

FIGS. 8A to 8C are views for explaining a method of manufacturing the molded object shown in FIG. 6 and show the CT data of a skull or the like;

FIGS. 9A to 9C are views for explaining the method of manufacturing the molded object shown in FIG. 6 and show the CT data of a flesh part or the like;

FIG. 12 is a table showing the CT values of human tissue;

DETAILED DESCRIPTION

Hereinafter, embodiments of the present disclosure will be described with reference to the drawings.

(Molding Apparatus)

(Configuration of Molding Apparatus)

Figure 1:
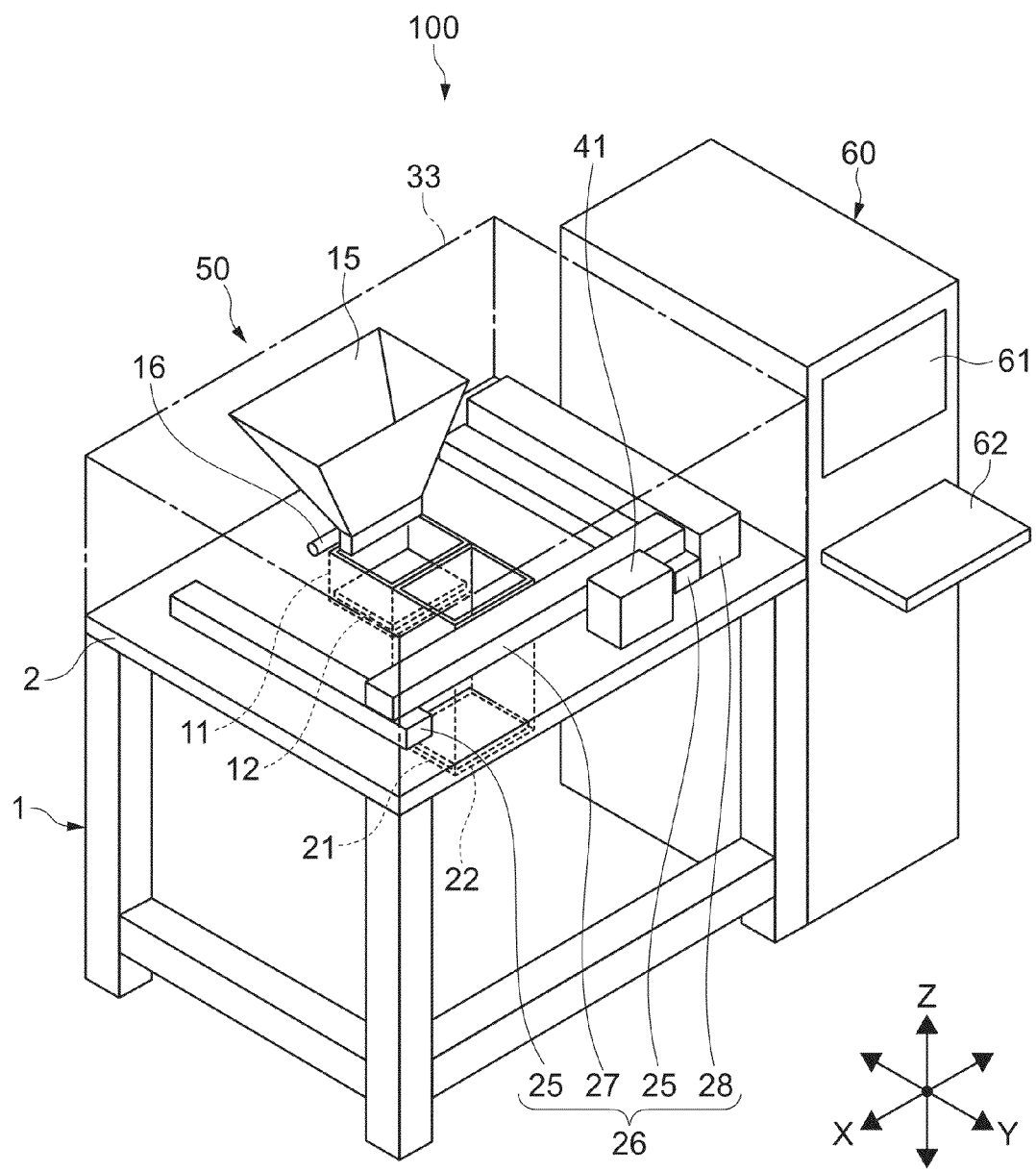
FIG. 1 is a view showing a molding apparatus according to an embodiment of the present disclosure.
Figure 2:
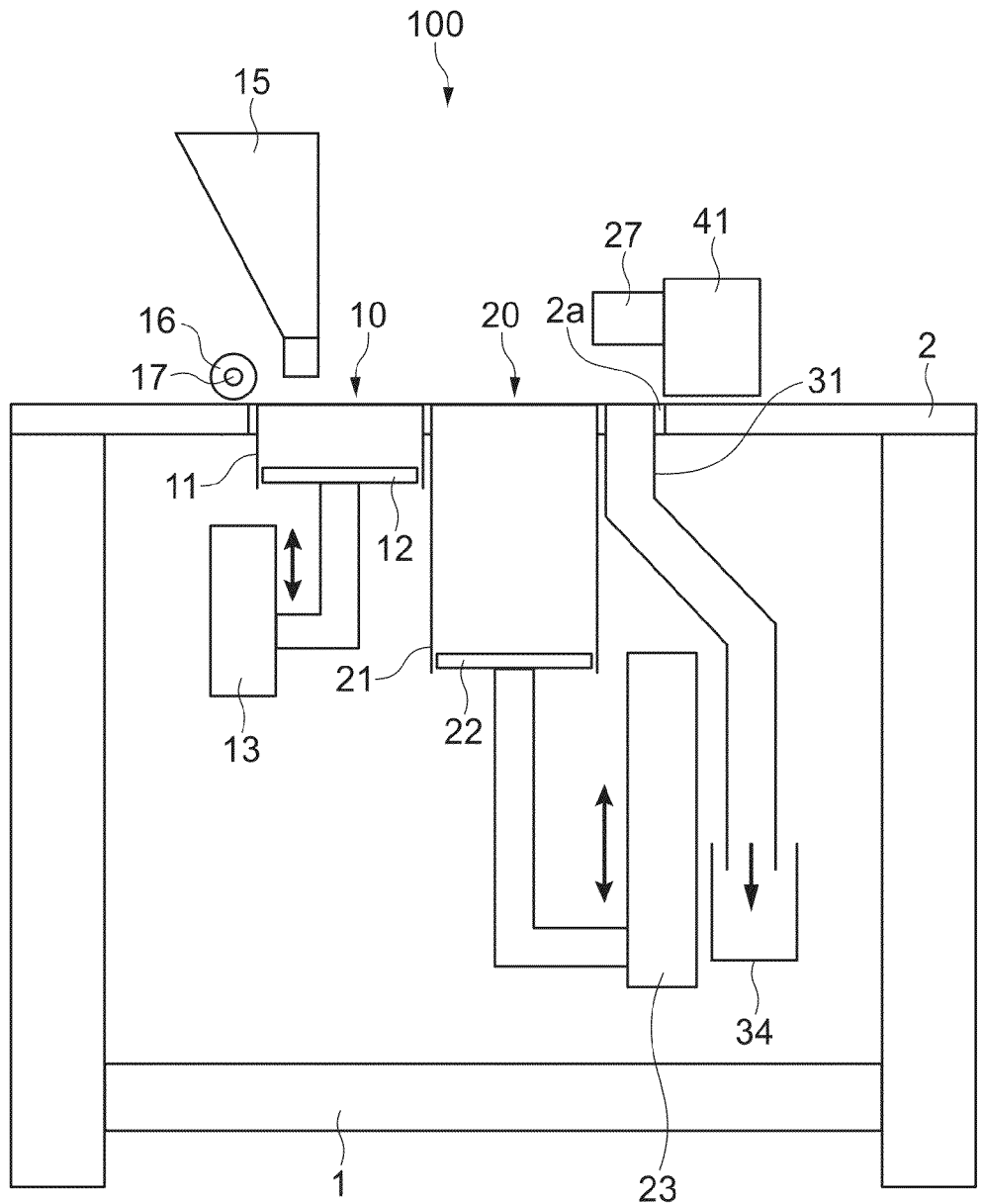
FIG. 2 is a side view of the molding apparatus shown in FIG. 1.
Figure 3:
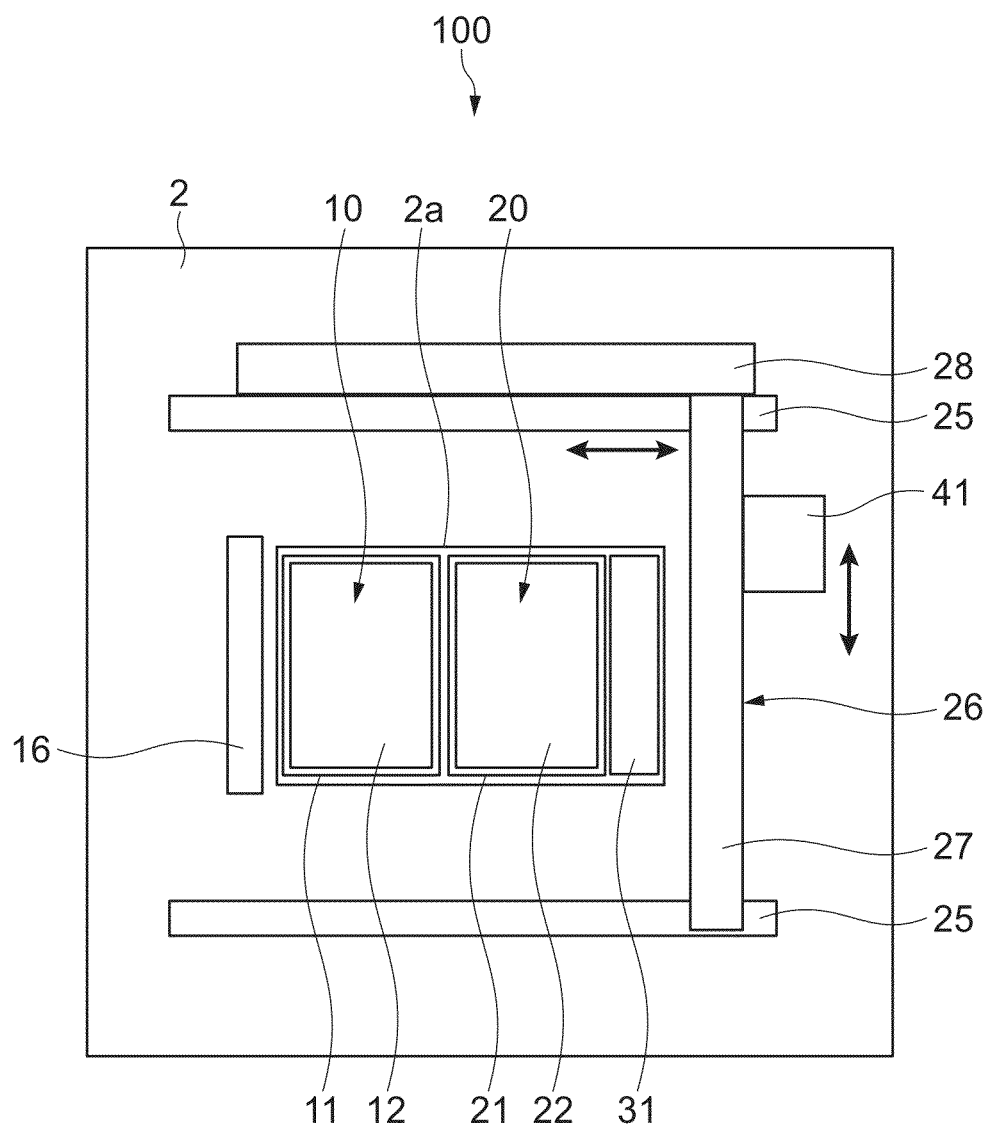
FIG. 3 is a plan view of the molding apparatus shown in FIG. 1.

FIG. 1 is a view showing a molding apparatus according to an embodiment of the present disclosure. FIG. 2 is a side view of the molding apparatus shown in FIG. 1, and FIG. 3 is a plan view of the molding apparatus.

The molding apparatus 100 has a molding unit 50 and a control unit 60 arranged next to the molding unit 50. The molding unit 50 has a frame 1 and a plate 2 fixed onto the frame 1. At about a central area of the plate 2, an opening 2a for use in molding operations is provided along a Y direction, i.e., the longitudinal direction of the plate 2. Under the opening 2a, a supplying part 10 that supplies a powder material (hereinafter simply referred to as powder), a molding part 20 that forms a molded object using the powder, and a discharging path member 31 (omitted in FIG. 1) that discharges the powder are arranged. As shown in FIGS. 2 and 3, the supplying part 10, the molding part 20, and the discharging path member 31 are arranged so as to be successively side by side along the Y direction from the left side of the figures.

Note that a frame (not shown) is also provided on the plate 2, and a cover is attached to the frame as shown in FIG. 1. The cover is made of acrylic or the like, and users are thus allowed to externally see the inside of the molding unit 50. Further, the cover is subjected to anti-static processing to prevent its visibility from being degraded due to the attachment of static-charged powder.

The supplying part 10 has a supplying box 11 capable of storing the powder 4 (see FIG. 5), a supplying stage 12 that is arranged inside the supplying box 11 and pushes upward the powder 4 stored in the supplying box 11 from below to supply the powder 4 onto the plate 2 via the opening 2a, and an elevating mechanism 13 that elevates the supplying stage 12 inside the supplying box 11. As the elevating mechanism 13, a ball screw mechanism, a belt mechanism, a rack-and-pinion mechanism, a cylinder mechanism, or the like is used.

As shown in FIGS. 1 and 2, over the supplying part 10, a tank shooter 15 that temporarily stores the powder supplied by an operator or a robot is provided. At the bottom of the tank shooter 15, a cover (not shown) that opens and closes with, for example, electrical control is provided. When the cover opens, the stored powder falls due to its own weight and is supplied to the supplying part 10.

As the powder 4, an aqueous material is used. For example, an inorganic substance such as salt, magnesium sulfate, magnesium chloride, potassium chloride, and sodium chloride is used. A mixture of sodium chloride and a bittern component (such as magnesium sulfate, magnesium chloride, and potassium chloride) may be used. That is, the mixture includes sodium chloride as its main component. Alternatively, an organic substance such as polyvinyl pyrrolidone, polyvinyl alcohol, carboxymethyl cellulose, ammonium polyacrylate, sodium polyacrylate, ammonium methacrylate, sodium methacrylate, and a copolymer thereof may be used.

The powder 4 typically has an average particle diameter of greater than or equal to 10 μm and less than or equal to 100 μm. Using salt as the powder 4 is environmentally friendly because energy for extraction, processing, or the like of the powder material is saved compared with a case where the powder material of metal, plastic, or the like is, for example, used.

The molding part 20 arranged next to the supplying part 10 has a molding box 21 capable of storing the powder 4, a molding stage 22 that is arranged inside the molding box 21, has the powder 4 stuck thereon, and supports a formed molded object from below, and an elevating mechanism 23 that elevates the molding stage 22 inside the molding box 21. As the elevating mechanism 23, a ball screw mechanism, a belt mechanism, a rack-and-pinion mechanism, a cylinder mechanism, or the like is used.

When seen in FIG. 2, the molding box 21 is set to have a length of 10 cm to 30 cm in the X direction and a length of 20 cm to 50 cm in the Y direction. However, the lengths of the molding box 21 are not limited within these ranges. The region where the powder stored in the molding box 21 is arranged is used as a molding enabling region.

The supplying box 11, the molding box 21, and the discharging path member 31 have respective openings at their upper parts, and each of the opening surfaces of the openings is arranged so as to face the opening 2a of the plate 2.

Near the end of the opening 2a of the plate 2 on the side of the supplying part 10, a roller 16 that conveys the powder 4 supplied from the supplying part 10 to the molding part 20 is arranged. The roller 16 has a rotary shaft 17 along a direction orthogonal to the direction in which the supplying box 11, the molding box 21, and the discharging path member 31 are aligned in a horizontal plane, i.e., the X direction. A motor (not shown) that rotates the rotary shaft 17 is also provided. On the plate 2, a mechanism (not shown) that moves the roller 16 in the Y direction is provided.

As shown in FIG. 2, the discharging path member 31 is provided in a folded state so as not to interfere with the elevating mechanism 23. Under the discharging path member 31, a collecting box 34 is arranged. The excessive powder falling via the discharging path member 31 due to its own weight is collected into the collecting box 34.

Over the plate 2, a print head 41 and a moving mechanism 26 that moves the print head 41 in the X and Y directions are provided. The print head 41 is capable of ejecting ink onto the powder 4 stuck on the molding stage 22 in the molding part 20.

The moving mechanism 26 has guide rails 25 extending along the Y direction on both sides in the X direction of the opening 2a, a Y axis driving mechanism 28 provided at the end of one of the guide rails 25, and an X axis driving mechanism 27 bridged between the guide rails 25. The print head 41 is connected to the X axis driving mechanism 27 so as to be capable of moving in the X direction. Further, with the Y axis driving mechanism 28, the X axis driving mechanism 27 is capable of moving in the Y direction along the guide rails 25. The X axis driving mechanism 27 and the Y axis driving mechanism 28 are composed of a ball screw mechanism, a belt mechanism, a rack-and-pinion mechanism, or the like.

The control unit 60 has the functions of a computer including a CPU, a RAM, and a ROM. In addition, the control unit 60 has a display part 61 arranged at an upper area of its front surface and input operations equipment 62 arranged below the display part 61. The input operations equipment 62 is typically composed of a keyboard. The display part 61 may have an input device with a touch panel.

To the control unit 60, CT (Computed Tomography) data is input. Based on the input CT data, the control unit 60 controls the operations of the respective parts of the molding unit 50 and the timings thereof to form a molded object. As will be described below, the CT data is, for example, at least one of the data of a CT histogram and CT image data.

Figure 4:
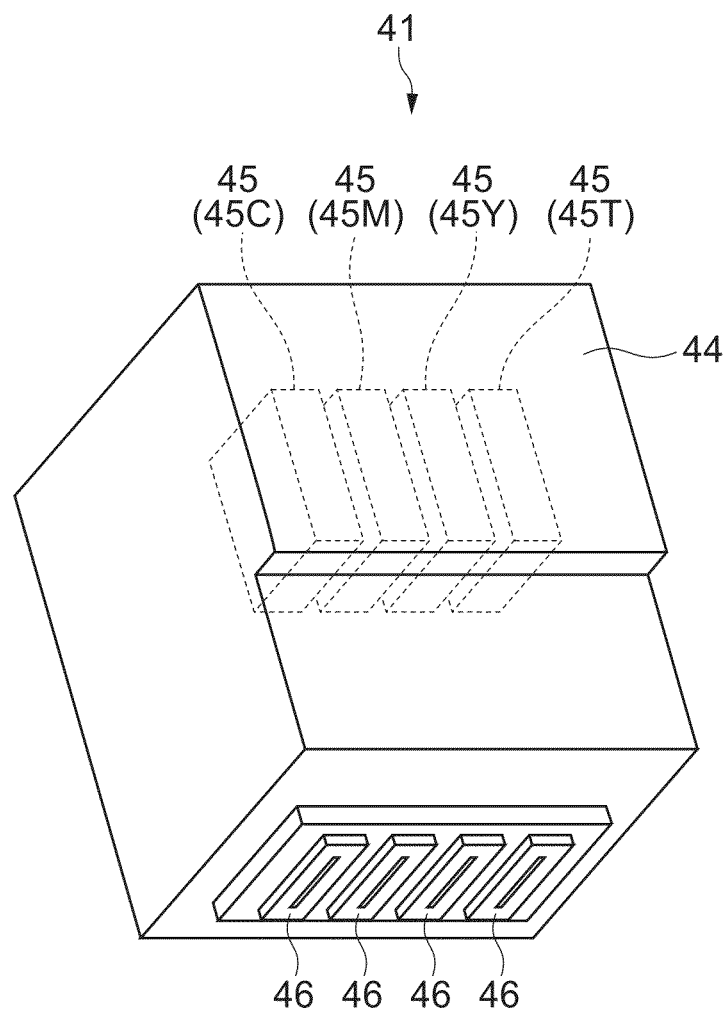
FIG. 4 is a view showing a print head according to the embodiment and is a perspective view as seen from below the print head.

FIG. 4 is a view showing the print head 41 according to the embodiment and is a perspective view as seen from below the print head 41.

As the print head 41, one having a structure for a general-purpose printer may be used. For example, inside an enclosure 44 of the print head 41, a plurality of ink tanks 45 are provided. The ink tanks 45 are tanks 45C, 45M, and 45Y that store the colors of ink, cyan, magenta, and yellow, respectively (hereinafter referred to as CMY).

In addition, inside the enclosure 44, a tank 45T that stores, for example, transparent ink (first liquid material) is provided. The transparent ink includes a binder as its component. An example of the binder typically includes, but is not limited to, polyvinyl alcohol.

The respective colors of ink (second liquid material) stored in the tanks 45C, 45M, and 45Y does not include the binder as the component included in the transparent ink stored in the tank 45T. As the material of the respective colors of ink, aqueous ink is, for example, used. Further, it is also possible to use ink for commercially available ink jet printers. The ink may be oily depending on the material of the powder 4.

At the bottom of the print head 41, a plurality of ink jet heads 46 are arranged. The ink jet heads 46 are connected to the respective ink tanks 45 via ink flow paths (not shown). The ink jet heads 46 are capable of ejecting the ink according to a known mechanism such as a piezo system and a thermal system. With the use of the ink jet heads 46, it is possible to form a molded object with high precision.

(Operations of Molding Apparatus)

FIGS. 5A to 5D are views successively showing the mechanical operations of the molding apparatus 100 and are schematic views as seen from the lateral surface of the molding apparatus 100. Before the molding apparatus 100 forms a molded object, the CT data of the object to be molded is input to the control unit 60. In the field of medical treatment, three-dimensional image data as CT image data is handled as, for example, DICOM (Digital Imaging and Communication in Medicine) data. Based on the CT data, the molding unit 50 successively laminates layers together to form the molded object. The DICOM data may include colorized image data. In this case, the molding apparatus 100 is allowed to form the colorized molded object.

FIGS. 5A to 5D show, as will be described later, a process of forming one layer (corresponding to a predetermined layer thickness) where the powder 4 is cured by the ejection of the ink from the print head 41. The powder 4 and powder 4 to be cured are indicated by dotted hatching, and a cured layer is indicated by black paint.

Figure 5A:
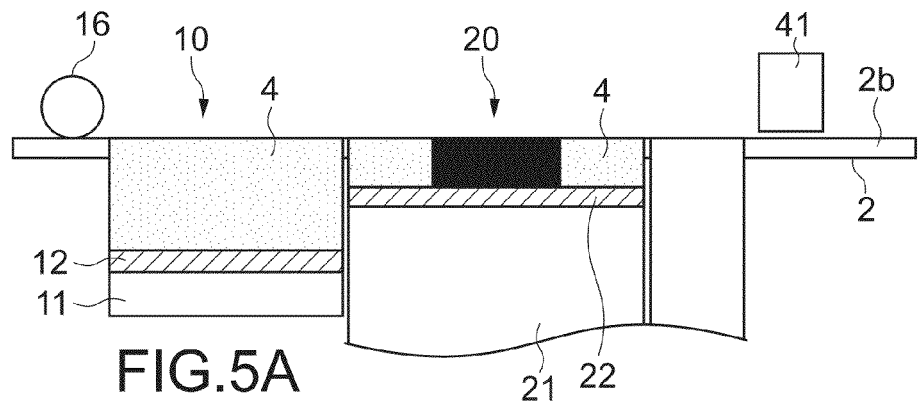
FIGS. 5A to 5D are views successively showing the mechanical operations of the molding apparatus and are schematic views as seen from the lateral surface of the molding apparatus.

As shown in FIG. 5A, the powder 4 is supplied from the tank shooter 15 into the supplying box 11 to be stored therein. On the molding stage 22 of the molding part 20, the cured layer and the powder layer to be cured are laminated. In this state, the process of forming the one cured layer is started. In FIG. 5A, the positions of the roller 16 and the print head 41 are set as their standby positions.

Figure 5B:
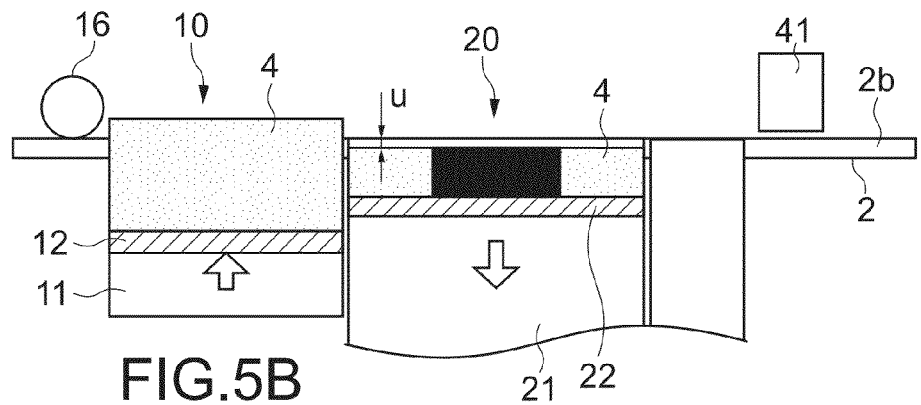

First, as shown in FIG. 5B, the powder 4 stuck on the supplying stage 12 of the supplying part 10 is pushed upward by the elevating mechanism 13 (see FIG. 2), so that the powder 4 slightly greater in amount than the one powder layer is supplied up to a position higher in level than a top surface 2b of the plate 2. Further, in the molding part 20, when the molding stage 22 is caused to fall by the elevating mechanism 23, space having a thickness of the one powder layer (cured layer) is provided between the top surfaces of the cured layer and the powder layer to be cured and the top surface 2b of the plate 2.

In FIG. 5B, a thickness u of the one powder layer is typically in the range of about 0.1 mm to 0.2 mm, but it may exceed or be less than the range.

Figure 5C:
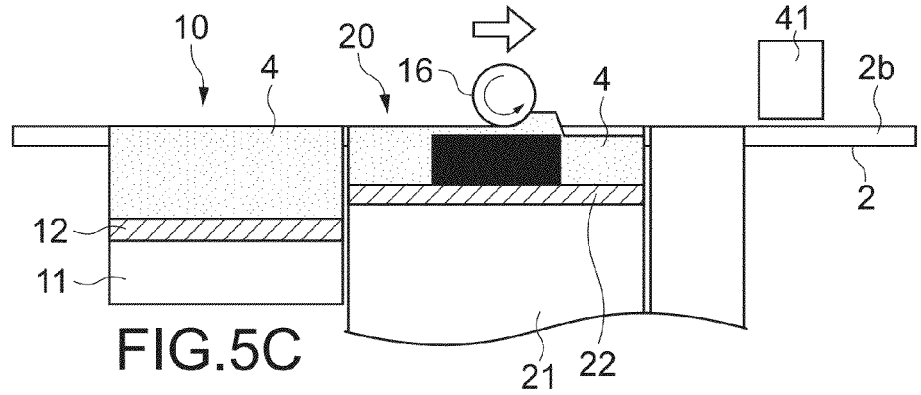

As shown in FIG. 5C, when the roller 16 rotates counter-clockwise and moves in the direction as indicated by a solid-white arrow, the powder 4 supplied from the supplying part 10 is conveyed. Here, the roller 16 rotates in the direction opposite to the direction in which the roller 16 is assumed to rotate with the friction between the roller 16 and the molding part 20 when the roller 16 rotates in the direction of the solid-white arrow in its rotatable state (where no torque is applied to the rotary shaft 17 of the roller 16). While being conveyed with such rotation of the roller 16, the powder 4 fills in the space provided at the top surfaces of the cured layer and the powder layer to be cured of the molding part 20, thereby forming the uniform powder layer.

Figure 5D:
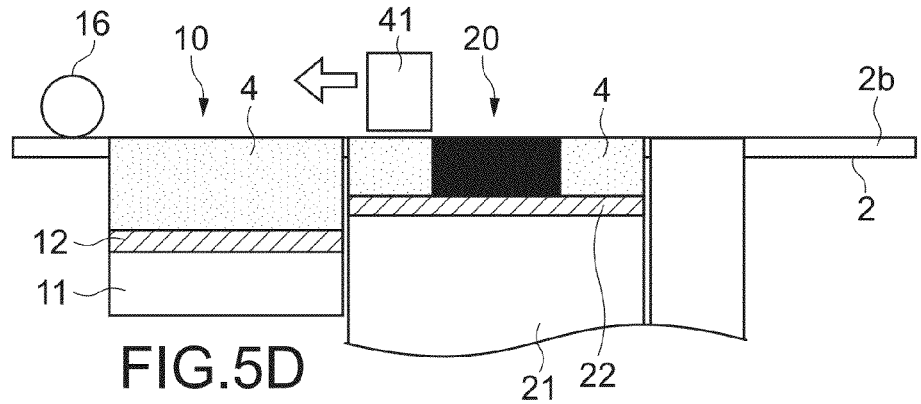

As shown in FIG. 5D, the roller 16 passes through the molding part 20 and discharges the excessive powder 4 from the discharging path member 31. Then, in synchronization with the returning operation of the roller 16 to the standby position, the print head 41 ejects the ink so as to draw a colorized image while being caused to move by the driving operation of the moving mechanism 26. In this case, the aqueous ink (colorized ink and transparent ink) permeates through the powder layer, and thus the powders 4 having the ink permeated therethrough are bonded together to form the cured layer.

Here, the print head 41 ejects the transparent ink including the binder to cure (solidify) the powders. That is, the transparent ink is ejected onto the same region as the region where the colorized ink (CMY ink) is ejected, thereby forming the cured layer of the colorized powders.

Note that in the case of forming a non-colorized cured layer, it is only necessary for the print head 41 to selectively eject only the transparent ink onto the molding enabling region.

Note that the print head 41 may start moving and ejecting the ink after the roller 16 completes the conveyance of the powder 4 and returns to the standby position. However, because the time period of the returning operation of the roller 16 and the time period of the moving operation of the print head 41 overlap each other as described above, it is possible to reduce the processing time.

When the print head 41 returns to the standby position, the process returns to the state shown in FIG. 5A where a cured object corresponding to the colorized DICOM data of one layer is formed. Through the repetitive operations described above, the molding apparatus 100 laminates the cured layers together to form the molded object.

It may also be possible to obtain a molded object having higher hardness in such a manner that the molded object is heated by a heating apparatus (not shown) other than the molding apparatus 100 after being removed by an operator or a robot.

(Method of Manufacturing Molded Object According to Embodiment of Present Disclosure)

In recent years, with the widespread use of CT scanning apparatuses and MRI (Magnetic Resonance Imaging) apparatuses, it has become popular to acquire the images of affected areas of specific persons so that the conditions of the affected areas are observed on the screens of PCs (Personal Computers) or to perform simulations for plastic surgeries. Such operations bring about various advantages. For example, reduction in operation time alleviates burdens on patients. Further, performing the simulations prior to the plastic surgeries alleviates burdens on doctors. Moreover, there are cases that simulations are performed prior to plastic surgeries using modeled real things such as bones. Next, a method of manufacturing a molded object including such an affected area of a patient will be described using the molding apparatus 100.

EXAMPLE 1

Figure 6:
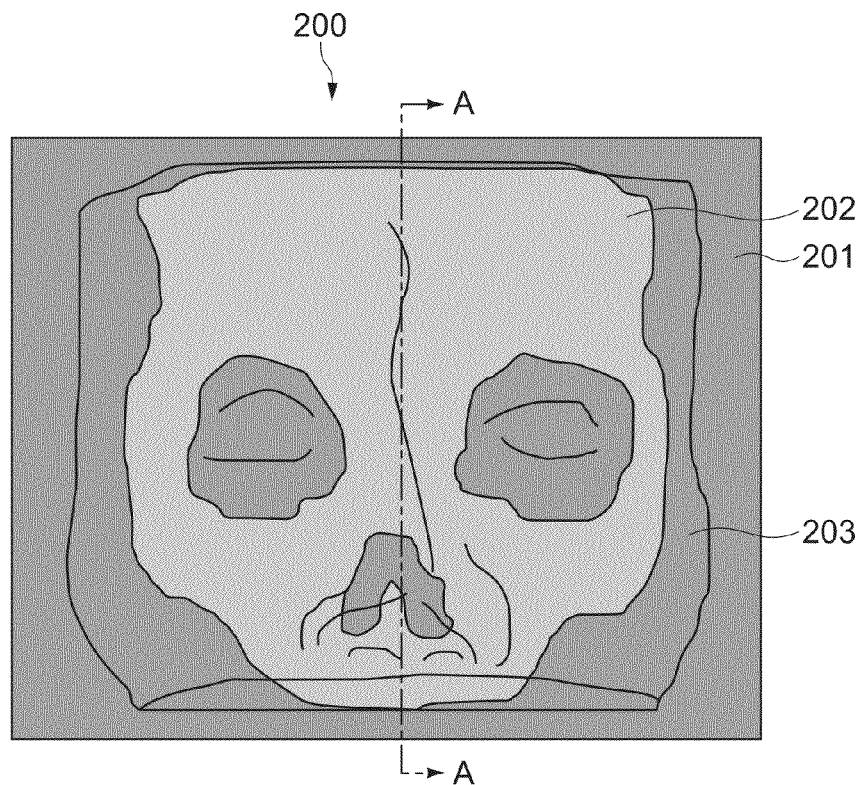
FIG. 6 is a view showing the molded object of part of a human head as an example of the molded object.
Figure 7:
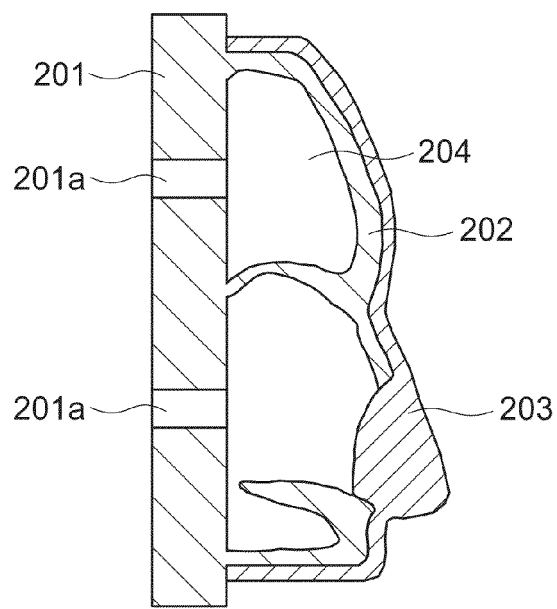
FIG. 7 is a cross-sectional view of the molded object taken along the line A-A in FIG. 6.

FIG. 6 is a view showing the molded object of part of a human head as an example of the molded object. FIG. 7 is a cross-sectional view of the molded object taken along the line A-A in FIG. 6. The molded object 200 has a base part 201, a hard part 202 formed on the base part 201, and a soft part 203 formed so as to cover the hard part 202. Of course, the base part 201 is not included in the object to be molded (i.e., human head).

As shown in FIG. 7, a cavity part 204 is formed between the base part 201 and the hard part 202. That is, in the molded object 200 according to this example, the human head is expressed by the two different materials of the hard part 202 (first part) and the soft part 203 (third part) softer than the hard part 202. The hard part 202 mainly expresses a bone part, while the soft part 203 mainly expresses muscles, fat, and skin. Further, in particular, the soft part 203 is made of a transmission material that causes visible light to be transmitted, i.e., a transparent material.

FIGS. 8A, 8B, and 8C to FIG. 11 are views for explaining the method of manufacturing the molded object 200. A computer (for example, the control unit 60 of the molding apparatus 100) maintains, for example, a CT histogram shown in FIG. 8A and CT image data corresponding to the data of the CT histogram. The CT image data is generated according to a known method and generated as, for example, DICOM data. Note that the control unit 60 may generate the CT image data instead.

Figure 8A:
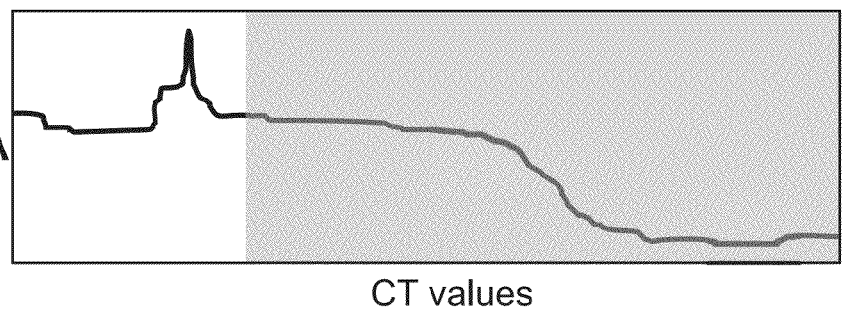

For example, the computer filters the CT histogram shown in FIG. 8A to obtain the image of the object to be molded. Here, FIG. 12 is a table showing the CT values of human tissue. That is, setting the hardness of water as the reference value 0, the table indicates that the tissue having the greater CT value is higher in hardness. In the graph of FIG. 8A, the horizontal axis represents the CT values, and the vertical axis represents frequencies (amounts).

Figure 8B:
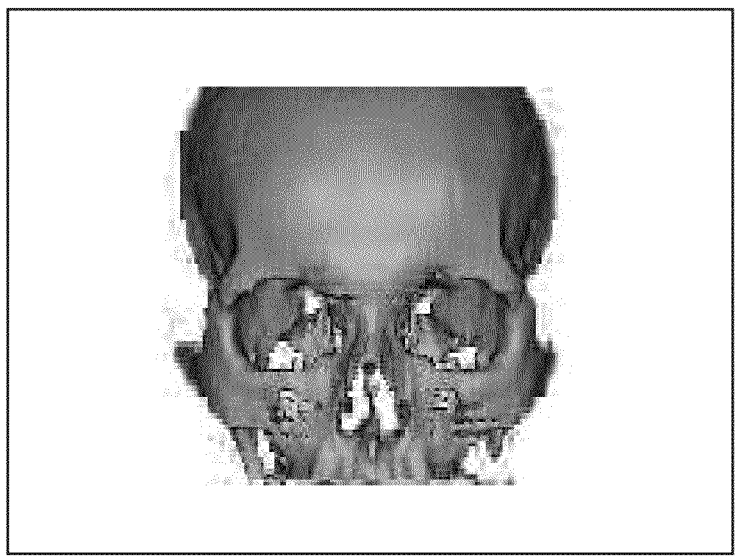

The image obtained by filtering the CT histogram is the image of the object to be molded. In the example shown in FIG. 8A, the computer extracts the CT value (part indicated by gray, which corresponds to, for example, a bone part, i.e., part of the hard part 202) greater than a predetermined value to obtain an image as shown in FIG. 8B. Then, based on the CT image data, the molding apparatus 100 forms the bone part, i.e., the part of the hard part 202 and a cavity part forming region 204' (second part) (see FIG. 10A) corresponding to a region (second region) to be used as the cavity part 204 using a lamination molding technology. The hard part 202 is insoluble in a solvent that will be described later, while the soft part 203 is soluble in the solvent.

Figure 10A:
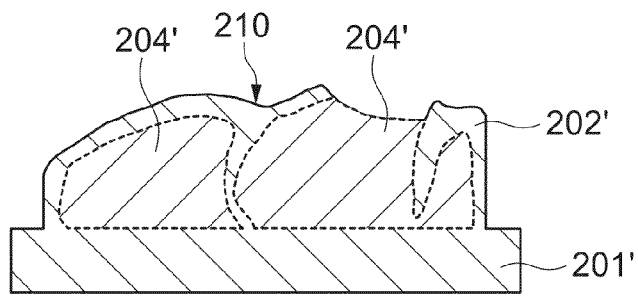
FIGS. 10A to 10D are views for successively explaining the method of manufacturing the molded object shown in FIG. 6.

FIG. 10A is a cross-sectional view showing a cured object (including the base part 201') having the hard part 202' and the cavity part forming region 204' formed so as to be surrounded by the hard part 202'. In forming the hard part 202', the molding apparatus 100 supplies at least the transparent ink including the binder to a region (first region), which corresponds to the hard part 202' including the base part 201', out of the molding enabling region. In this case, the control unit 60 ejects the transparent ink based on data where the CT image data of the bone part (including the cavity part forming region 204') and the base part 201 are combined together. In the cured object shown in FIG. 10A, the parts other than the base part 201' serve as a main body part.

When colorizing the hard part 202', the molding apparatus 100 also ejects the color ink onto the first region. For example, if the main component of the powder is salt, the colorization is not necessary to form the white bone part because the color of salt is white. Therefore, it is possible to use the basic color white as it is.

Note that when forming the cured object shown in FIG. 10A, it is only necessary for the molding apparatus 100 to laminate layers together from the base part 201' to the front surface of the face. Alternatively, when forming the cured object, the molding apparatus 100 may laminate the layers together from the head to the jaw (or from the jaw to the head) so that the base part 201 is vertically provided.

Further, in order to form the cavity part forming region 204', the molding apparatus 100 supplies at least one of the color ink CMY that does not include the binder to a region (second region), which corresponds to the cavity part forming region 204', out of the molding enabling region. For example, if the powder includes a component serving as an adhesive such as the polyvinyl pyrrolidone described above, the polyvinyl pyrrolidone dissolves in moisture included in the color ink, thereby causing the powder to maintain a certain degree of adhesiveness (temporarily maintain adhesiveness). Therefore, even if the color ink does not have the binder included in the transparent ink, it is possible to temporarily cure the powder. Thus, the cavity part forming region 204' is formed.

Figure 8C:
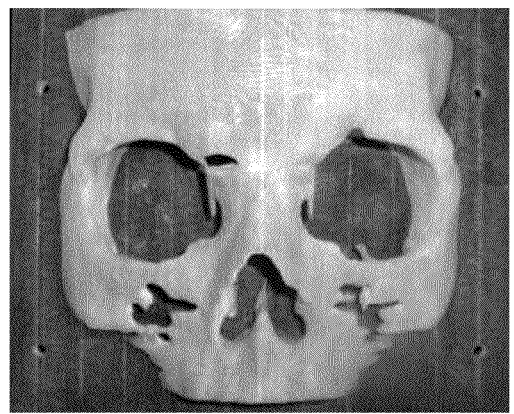

Note that FIG. 8C is a view showing the cured object where the cavity part 204 is formed.

Figure 9A:
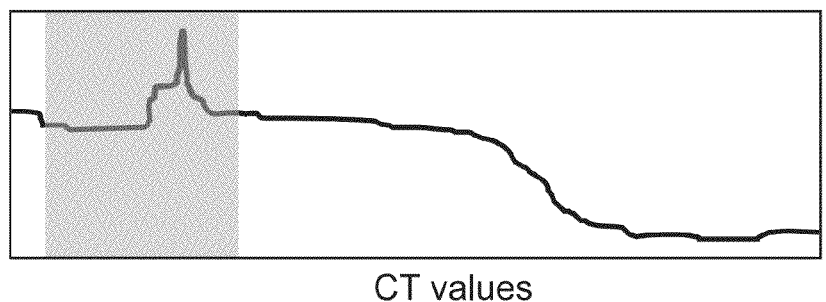
Figure 9B:
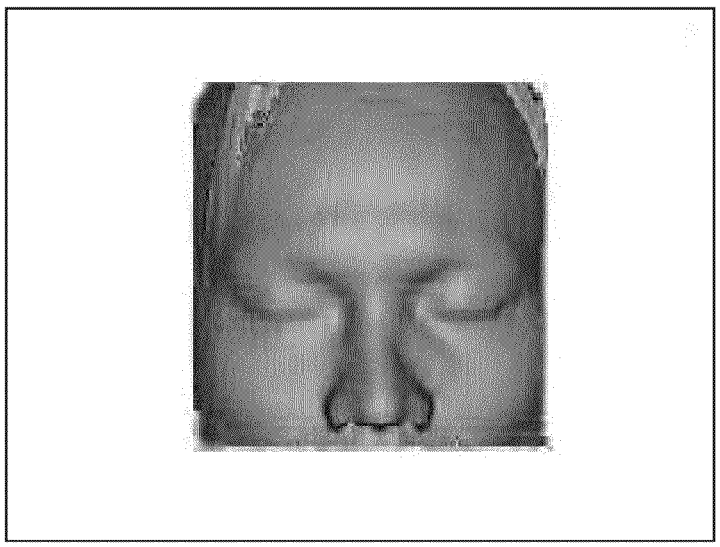
Figure 9C:
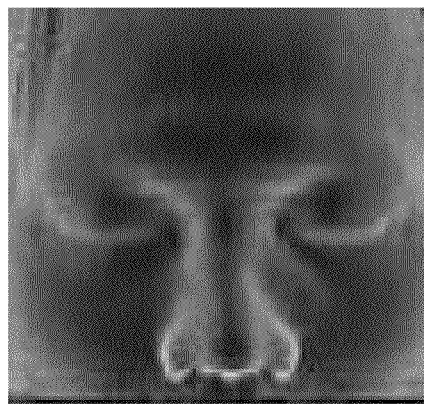
Figure 10B:
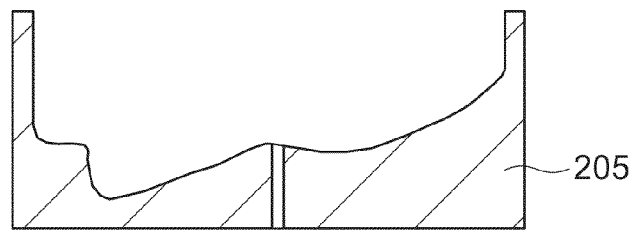

Next, as shown in FIG. 9A, the computer performs filtering for extracting a flesh part (including a non-skin part or the like) as the soft part 203 in the CT histogram to obtain an image shown in FIG. 9B. The computer performs, for example, a Boolean operation using the data of the image to obtain the image of a molding die where the soft part 203 is inverted. Based on image data of the molding die 205, the molding apparatus 100 forms the molding die 205 as shown in FIGS. 9C and 10B using the lamination molding technology. In this case, the molding die 205 may also be formed in such a manner that the transparent ink is supplied as described above.

Figure 10C:
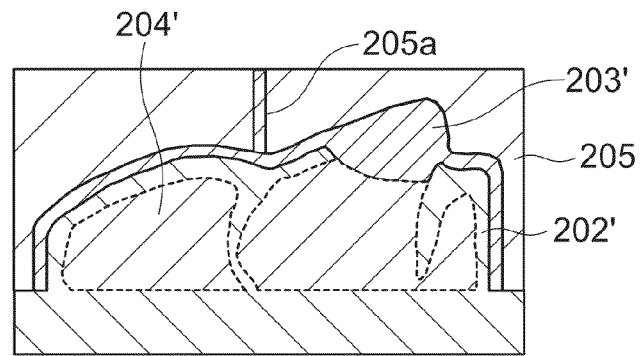

Then, as shown in FIG. 10C, the cured object 210 shown in FIG. 10A and the molding die 205 shown in FIG. 10B formed in the manner described above are combined together, and a material (molding material) 203' different from the powder is supplied between the cured object 210 and the molding die 205. The molding material 203' is typically a thermosetting resin. For example, a silicone resin is used as the molding material 203'. After being filled, the molding material 203' is heated at 150° C. for about 30 minutes. As a result, the resin is cured. More specifically, in a state where the frame of the molding die 205 is brought into contact with the base part 201 so as to cover the main body part with the molding die 205, the molding material 203' is supplied to the cavity between the cured object 210 and the molding die 205 via a sprue 205a provided in the molding die 205.

As a result, the soft part 203 (third part) as the flesh part is formed so as to cover at least part of the hard part 202'. In this example, in order to form the soft part 203, a material that will have relatively low hardness after being cured is used as the molding material 203'. However, the molding material may be appropriately changed according to an object to be molded.

The sprue 205a may be formed simultaneously with the formation of the molding die 205 using the lamination molding technology. Alternatively, it may also be possible that the molding die 205 that does not have the sprue 205a is formed using the lamination molding technology and then the sprue 205a is formed in the molding die 205 using processing technology other than the lamination molding technology.

In the cavity part forming region 204', the temporarily cured powder is filled. In a molding step shown in FIG. 10C, the powder existing in the cavity part forming region 204' serves as a mask or a spacer with respect to the molding material. When seen in a cross-sectional view shown in FIG. 10C, it seems that the inside and the outside of the bone part (hard part 202') are not in communication with each other. However, as shown in FIG. 8B, the human skull has at least holes where eye balls are located and holes where nasal cavities are formed. If the powder does not exist in the cavity part forming region 204', the molding material enters the inside of the bone part via such holes of the bone part.

Figure 11:
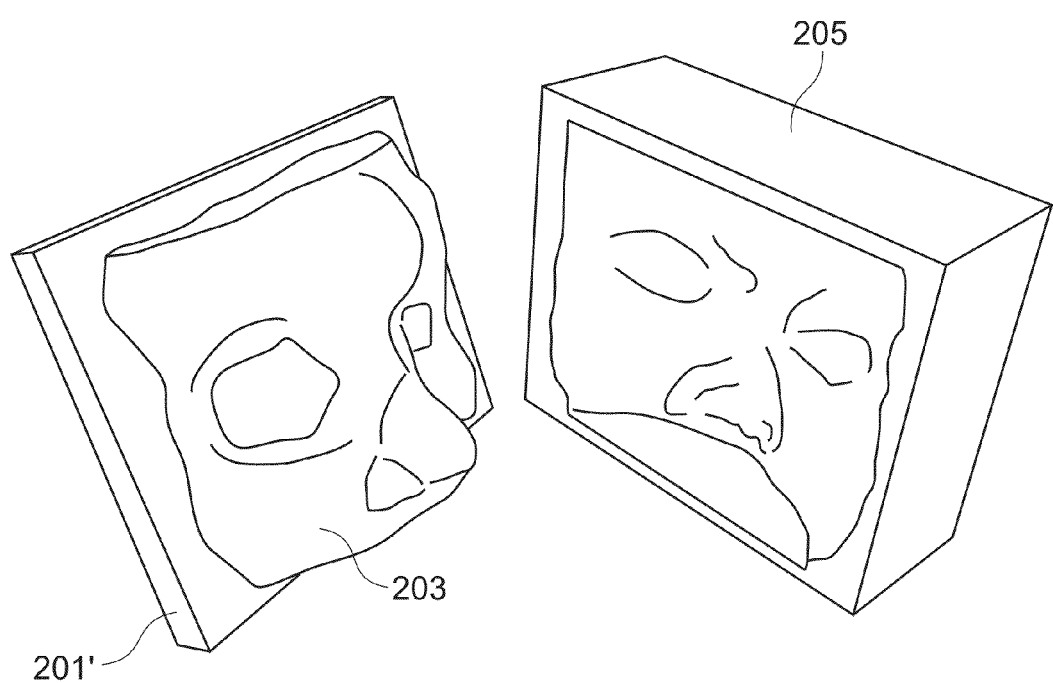
FIG. 11 is a view for explaining the method of manufacturing the molded object shown in FIG. 6 and shows the molded object where the flesh part is formed using a releasing die.

After that, as shown in FIG. 11, the soft part 203 is formed using the molding die 205, and then the molding die 205 is released.

Figure 10D:
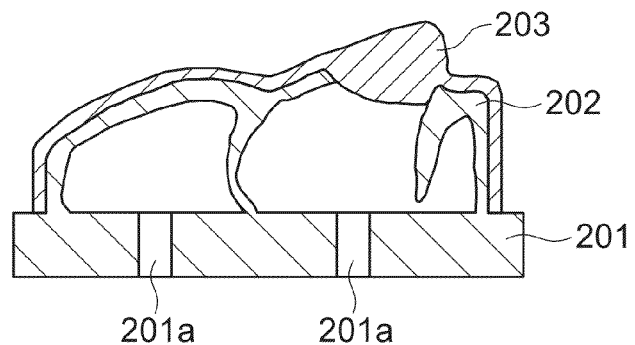

Next, as shown in FIG. 10D, one or a plurality of discharging holes 201a are formed in, for example, the base part 201, and a solvent is poured from the discharging holes 201a. The solvent dissolves the powder temporarily cured as the color ink that does not include the binder is supplied. The dissolved powder is discharged from the discharging holes 201a. Thus, the molded object 200 shown in FIG. 6 is manufactured.

As the solvent, water, ethanol, or the like is used. The solvent is not limited to them, and may be any material so long as it is capable of dissolving the temporarily cured powder for forming the cavity part 204 and does not influence the cured state of the powder other than that of the cavity part 204.

As described above, according to the manufacturing method of the embodiment, the soluble part provided so as to be surrounded by the insoluble part is dissolved in the solvent to form the molded object 200 having the cavity part 204 provided so as to be surrounded by the insoluble part. As a result, it is possible to form the cavity part 204 provided inside the molded object 200 and accurately reproduce the inner structure of the molded object 200.

In addition, according to the embodiment, the cured object 210 including the cavity part forming region 204' shown in FIG. 10A is formed at a time using the lamination molding technology. Therefore, it is possible to easily form the cavity part 204 and contribute to reduction in manufacturing time.

As described above, because it is possible for users such as doctors to easily recognize the inner structures of molded objects, the present disclosure is effective for making simulations of plastic surgeries, making explanations to patients, or the like.

EXAMPLE 2

Next, a method of manufacturing a molded object according to another Example will be described with reference to FIGS. 13A, 13B, and 13C to FIG. 17. In this Example 2, the molded object is manufactured in the same manner as the Example 1.

Figure 13A:
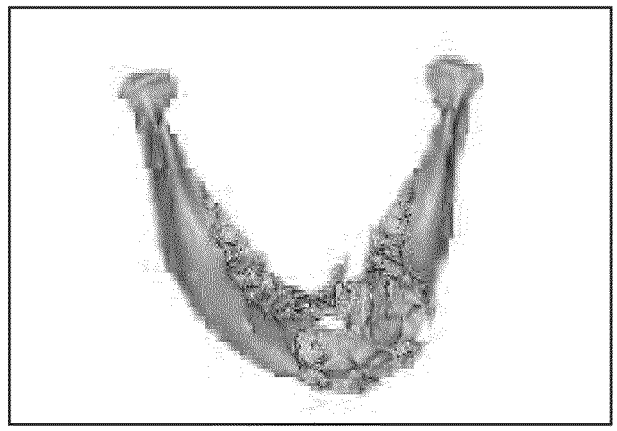
FIGS. 13A to 13C are views for explaining a method of manufacturing a molded object according to another Example and show CT data.
Figure 13B:
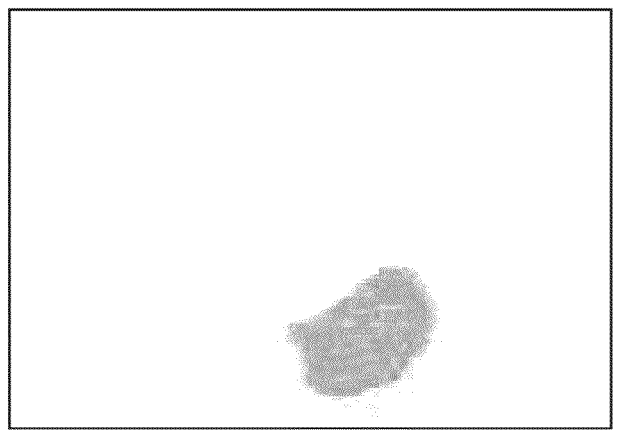
Figure 13C:
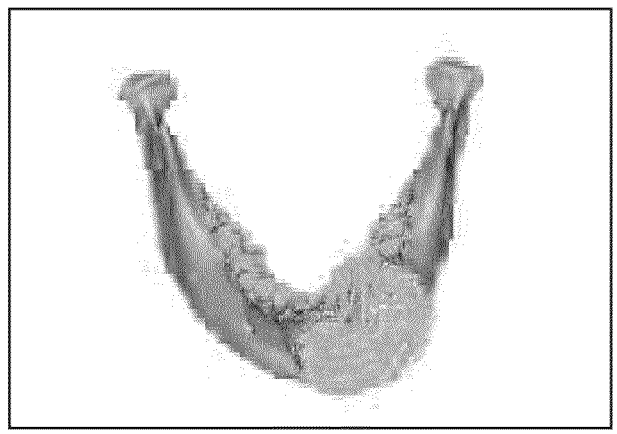

FIGS. 13A to 13C are views showing CT images for forming the molded object including a tumor developed in a human jawbone. Using the CT histogram described above, the computer generates the CT image of the human jaw part 302 shown in FIG. 13A, the CT image of the tumor shown in FIG. 13B, and the CT image shown in FIG. 13C where the CT image of the human jaw part 302 and the CT image of the tumor are combined together.

Figure 14:
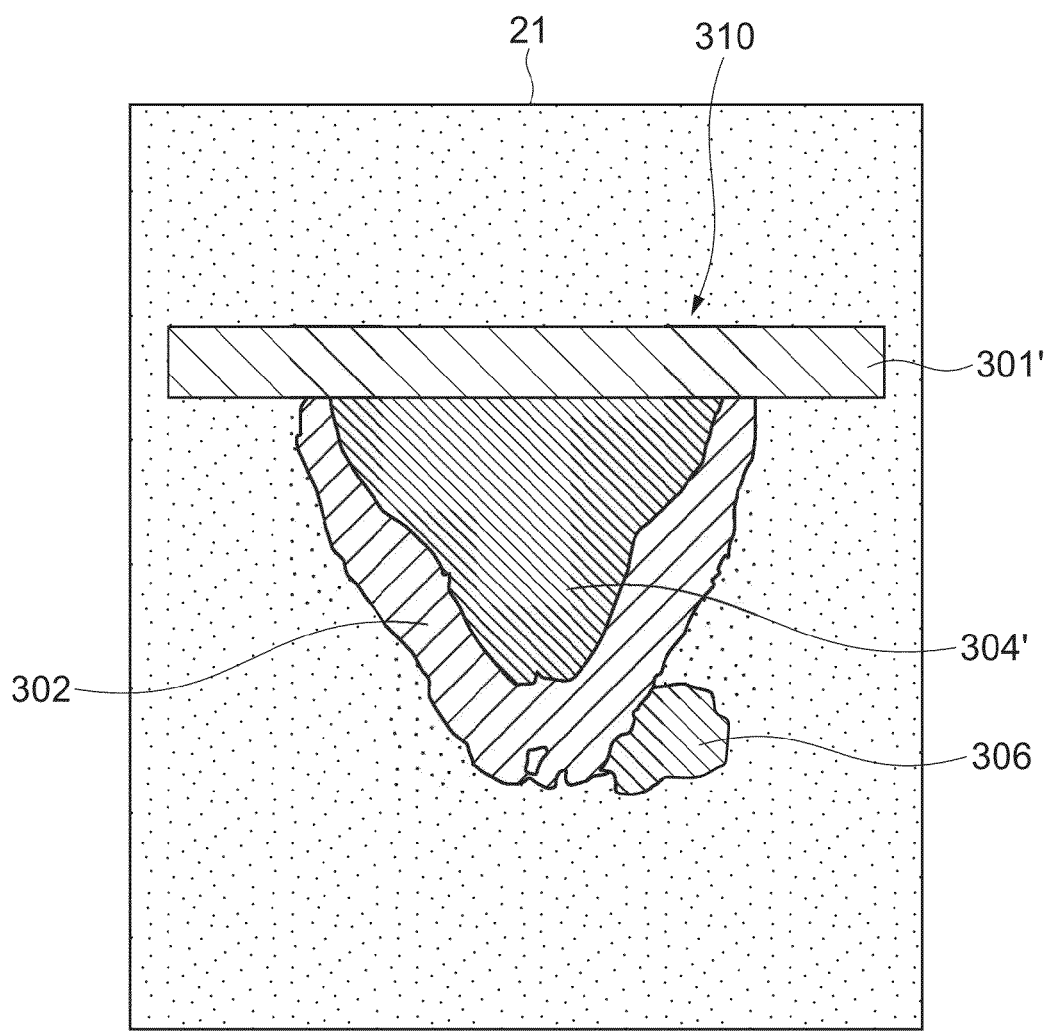
FIG. 14 is a view for explaining the method of manufacturing the molded object shown in FIGS. 13A to 13C and is a cross-sectional view of the molding enabling region of the molding apparatus when seen from the Z direction.

FIG. 14 is a cross-sectional view of the molding enabling region of the molding apparatus 100, i.e., the inner region of the molding box 21 when seen from the Z direction. A cured object 310 has a plate-shaped base part 301', a jaw part 302, a tumor part 306, and an inner part 304' of the jaw part 302. The region where the base part 301', the jaw part 302, and the tumor part 306 are formed is a first region. The first region is formed in such a manner that the ink including the binder is ejected to cure the same powder material. The region of the inner part 304' of the jaw part 302 is a second region where a cavity part 304 is to be formed. The inner part 304' of the jaw part 302 is formed in such a manner that the ink that does not include the binder is ejected to temporarily cure the same powder material as that of the base part 301', the jaw part 302, and the tumor part 306.

In this case, the cured object 310 is given different colors. For example, the bone part of the jaw part 302 is colored in white, the teeth of the jaw part 302 are colored in blue, neural tubes and blood vessels inside the jaw part 302 are colored in red, and the tumor part 306 is colored in green.

Figure 15:
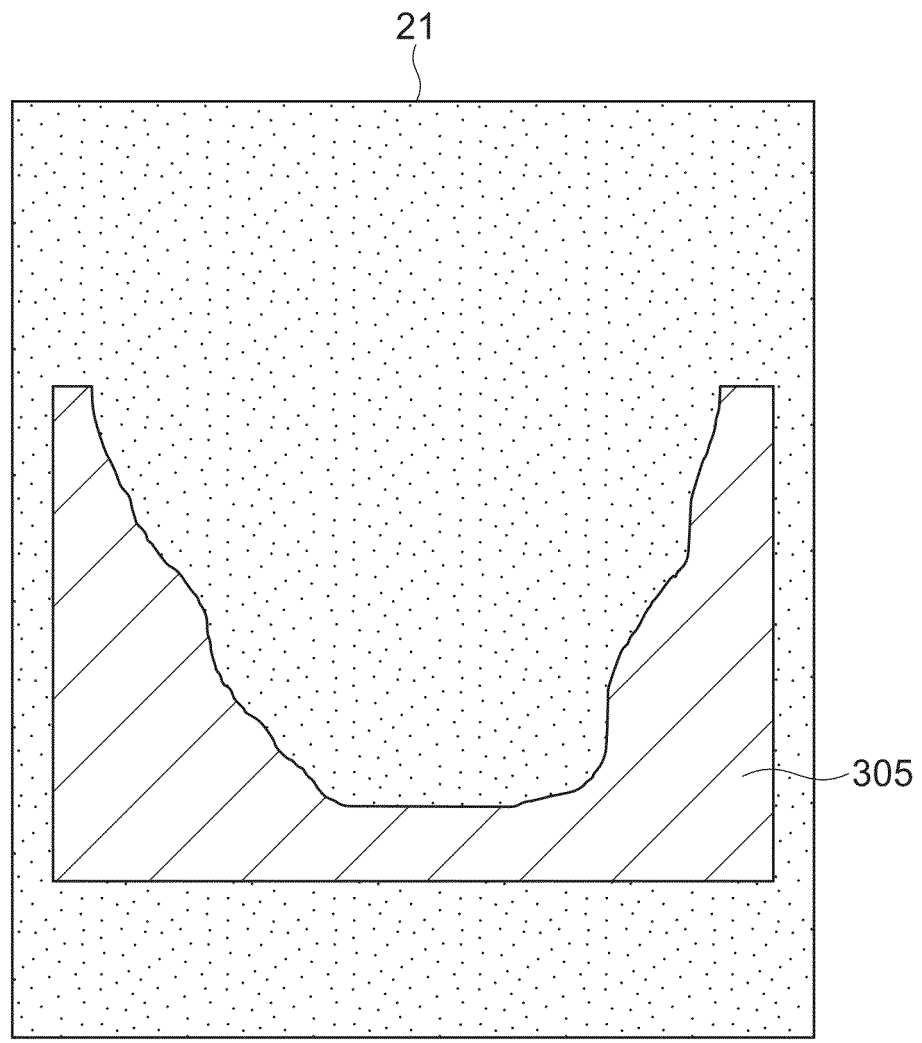
FIG. 15 is a cross-sectional view showing the cured object of a molding die for forming a flesh part at the front surface of the cured object shown in FIG. 14, the molding die being formed within the molding enabling region.
Figure 16:
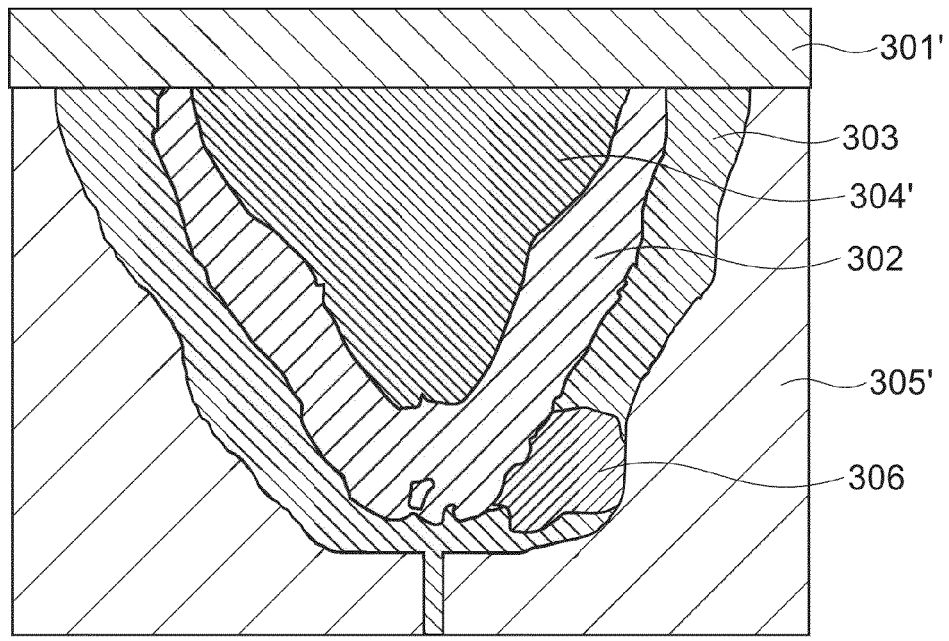
FIG. 16 is a cross-sectional view showing the molded object where the flesh part is formed so as to cover a jaw part using the molding die shown in FIG. 15.

FIG. 15 is a cross-sectional view showing the cured object of a molding die 305 for forming a flesh part at the front surface of the cured object shown in FIG. 14, the molding die 305 being formed inside the molding box 21 as in the Example 1. In this manner, the molding die 305 is formed using the lamination molding technology. The material of the molding die 305 may be the same as the powder material of the cured object 310 (see FIG. 14). Next, as shown in FIG. 16, the flesh part is formed using the molding die 305 shown in FIG. 15 so as to cover the jaw part 302. Like the Example 1, a transparent resin or rubber is, for example, used as the flesh part 303.

Figure 17:
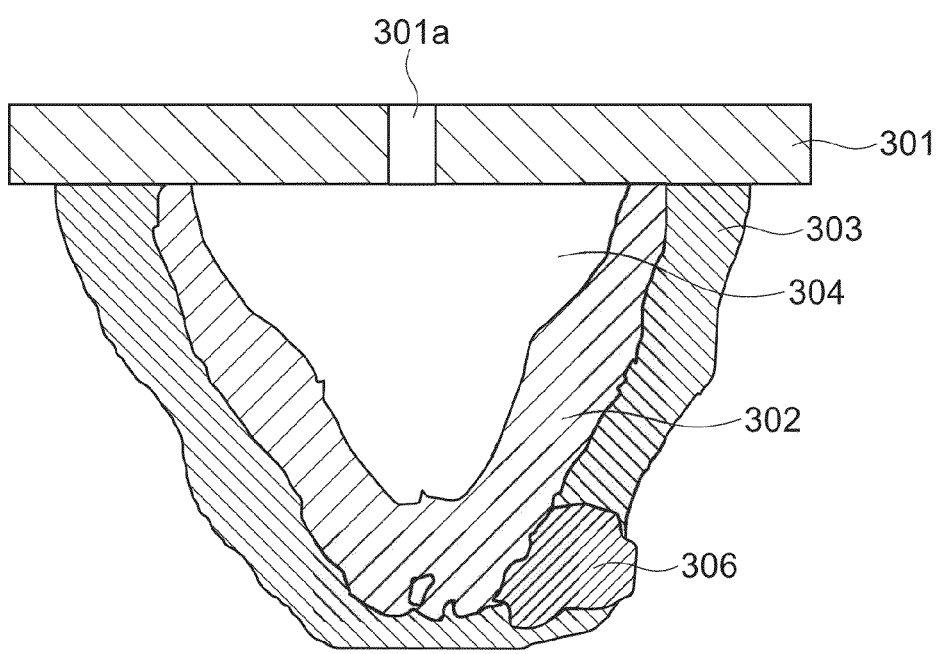
FIG. 17 is a cross-sectional view showing the molded object formed when a cured object inside the jaw part is dissolved.
Figure 18:
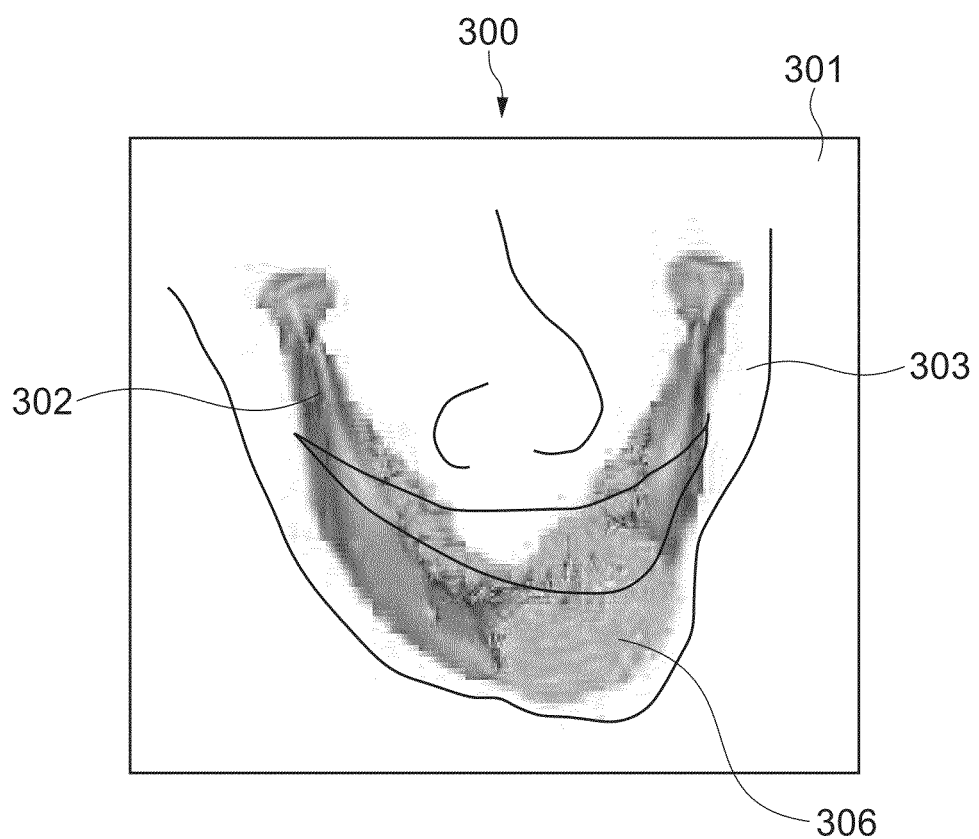
FIG. 18 is a front view schematically showing the final molded object including the jaw part and a tumor part.

Then, the molding die 305 is released as shown in FIG. 17, and a solvent is poured via a discharging hole 301a formed in the base part 301'. As a result, a cured object inside the jaw part 302 is dissolved, the dissolved cured object is discharged from the discharging hole 301a, and the cavity part 304 is formed. In this manner, as shown in FIG. 18, it is possible to form the molded object 300 that allows users such as doctors to see the tumor part 306 or the like developed in the jaw part 302 from the outside of the molded object 300.

According to the embodiment, it is possible to form the cavity part 304 provided inside the molded object 300 and accurately reproduce the inner structure of the molded object 300.

Other Embodiments

The present disclosure is not limited to the embodiment described above, and various other embodiments may be implemented.

The molding apparatus 100 is an example of an apparatus that performs lamination molding using a powder material, and the structure of the molding apparatus 100 may be modified in various ways so long as it is within the scope of the present disclosure.

In the embodiment described above, the tanks for the color ink and the tank for the transparent ink including the binder are provided in the print head 41. However, it may also be possible that the tank for the transparent ink that does not include the binder is provided in the print head 41 and that the transparent ink that does not include the binder is supplied to the regions where the cavity parts 204 and 304 are formed.

In the embodiment described above, the one print head 41 is provided. However, a plurality of print heads may be provided. In this case, the print head having the ink tanks for the color ink that do not include the binder and the print head having the ink tank for the transparent ink that includes the binder may be provided.

The print head 41 according to the embodiment described above has the plurality of ink tanks and the plurality of ink jet heads. However, the print head may have the plurality of ink tanks and the one ink jet head.

In the embodiment described above, the transparent ink including the binder is used as the first liquid material for forming the molded parts insoluble in the solvent, and the ink that does not include the binder is used as the second liquid material for forming the molded parts soluble in the solvent. However, the difference between the first liquid material for forming the parts insoluble in the solvent and the second liquid material for forming the second parts soluble in the solvent may be at least a difference in the component amount of the binder (component ratio). That is, the first liquid material may include the binder at a first component ratio, and the second liquid material may include the binder at a second component ratio lower than the first component ratio. The first and second component ratios may be set by those skilled in the art according to a combination of various materials including powder materials and solvent materials.

Further, nonessential materials that do not change the substantial functions of the liquid material and the powder material ejected from the print head may be added to the compositions of the liquid material and the powder material.

If the powder does not include the component of the binder and the ink does not also include the component of the binder, it is possible to cure the powder of the region where the cavity part 204 is formed with the provision of the print head that ejects an adhesive soluble in the solvent as the second liquid material in the molding apparatus 100. That is, the print head is capable of ejecting the adhesive for temporarily forming a cured layer.

In the Examples 1 and 2 of the embodiment described above, the bone parts (and the parts for forming the cavity parts 204 and 304) are formed using the lamination molding technology, and the flesh parts are formed using the molding dies 205 and 305. However, both the bone parts and the flesh parts may be formed using the lamination molding technology.

The molded objects according to the Examples 1 and 2 are those used in the field of medical treatment. However, the present disclosure may also be applied to molded objects targeted at machines, apparatuses, parts, or the like used in the field of industry.

Among the features of the respective embodiments described above, at least two of them may be combined together.

Note that the present disclosure may also employ the following configurations.

(1) A method of manufacturing a molded object, the method including:
supplying a first liquid material to a first region out of a molding enabling region where a powder material is arranged and curing the powder material of the first region using a lamination molding technology to form a first insoluble part insoluble in a solvent;
supplying a second liquid material different from the first liquid material to the powder material of a second region, which is provided so as to be surrounded by the first region, out of the molding enabling region and curing the powder material of the second region using the lamination molding technology to form a second soluble part soluble in the solvent; and
dissolving the second part in the solvent.

(2) The method of manufacturing the molded object according to (1), the method further including:
before dissolving the second part in the solvent,
forming a molding die for forming a third part different from the first and second parts of the molded object based on three-dimensional image data of the object to be molded; and
forming the third part covering at least part of the first part by supplying a material different from the powder material between the molding die and a cured object including the formed first and second parts and by curing the supplied material.

(3) The method of manufacturing the molded object according to (2), in which
the third part is made of a transmission material that causes visible light to be transmitted.

(4) The method of manufacturing the molded object according to any one of (1) to (3), in which
the first part has a base part corresponding to a part not included in the object to be molded and a main body part corresponding to a part included in the object to be molded, the main body part being formed on the base part, and
the forming the third-part includes supplying the material for forming the third part in a state where the molding die is brought into contact with the base part so as to cover the main body part with the molding die.

(5) The method of manufacturing the molded object according to any one of (2) to (4), in which
the molded object is formed such that the third part becomes softer than the first part.

(6) The method of manufacturing the molded object according to any one of (1) to (5), in which
the first liquid material includes a binder, and
the second liquid material does not include the binder.

(7) The method of manufacturing the molded object according to any one of (1) to (6), in which
in the lamination molding technology, an ink jet head ejects the first and second liquid materials.

(8) A molded object manufactured using a method of manufacturing the molded object, the method including:
supplying a first liquid material to a first region out of a molding enabling region where a powder material is arranged and curing the powder material of the first region using a lamination molding technology to form a first insoluble part insoluble in a solvent;
supplying a second liquid material different from the first liquid material to the powder material of a second region, which is provided so as to be surrounded by the first region, out of the molding enabling region and curing the powder material of the second region using the lamination molding technology to form a second soluble part soluble in the solvent; and
dissolving the second part in the solvent.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of manufacturing a molded object, the method comprising:
supplying a first liquid material to a first region out of a molding enabling region where a powder material is arranged and curing the powder material of the first region using a lamination molding technology to form a first insoluble part insoluble in a solvent;
supplying a second liquid material different from the first liquid material to the powder material of a second region, which is provided so as to be surrounded by the first region, out of the molding enabling region and curing the powder material of the second region using the lamination molding technology to form a second soluble part soluble in the solvent; and
dissolving the second part in the solvent.

2. The method of manufacturing the molded object according to claim 1, the method further comprising:
before dissolving the second part in the solvent,
forming a molding die for forming a third part different from the first and second parts of the molded object based on three-dimensional image data of the object to be molded; and
forming the third part covering at least part of the first part by supplying a material different from the powder material between the molding die and a cured object including the formed first and second parts and by curing the supplied material.

3. The method of manufacturing the molded object according to claim 2, wherein
the third part is made of a transmission material that causes visible light to be transmitted.

4. The method of manufacturing the molded object according to claim 2, wherein
the first part has a base part corresponding to a part not included in the object to be molded and a main body part corresponding to a part included in the object to be molded, the main body part being formed on the base part, and
the forming the third part includes supplying the material for forming the third part in a state where the molding die is brought into contact with the base part so as to cover the main body part with the molding die.

5. The method of manufacturing the molded object according to claim 2, wherein
the molded object is formed such that the third part becomes softer than the first part.

6. The method of manufacturing the molded object according to claim 1, wherein
the first liquid material includes a binder, and
the second liquid material does not include the binder.

7. The method of manufacturing the molded object according to claim 1, wherein
in the lamination molding technology, an ink jet head ejects the first and second liquid materials.

8. A molded object manufactured using a method of manufacturing the molded object, the method comprising:
supplying a first liquid material to a first region out of a molding enabling region where a powder material is arranged and curing the powder material of the first region using a lamination molding technology to form a first insoluble part insoluble in a solvent;
supplying a second liquid material different from the first liquid material to the powder material of a second region, which is provided so as to be surrounded by the first region, out of the molding enabling region and curing the powder material of the second region using the lamination molding technology to form a second soluble part soluble in the solvent; and
dissolving the second part in the solvent.

* * * * *